United States Patent [19]

Simmons et al.

[11] Patent Number: 4,569,043
[45] Date of Patent: Feb. 4, 1986

[54] ARRANGEMENT FOR INTERFACING THE SPACE STAGE TO THE TIME STAGES OF A T-S-T DIGITAL SWITCHING SYSTEM

[75] Inventors: Nathaniel Simmons, Downers Grove, Ill.; Sergio E. Puccini, Scottsdale, Ariz.; Stig E. Magnusson; Kamal I. Parikh, both of Phoenix, Ariz.

[73] Assignee: GTE Automatic Electric Inc., Northlake, Ill.

[21] Appl. No.: 773,083

[22] Filed: Sep. 3, 1985

Related U.S. Application Data

[63] Continuation of Ser. No. 506,743, Jun. 22, 1983, abandoned.

[51] Int. Cl.[4] .......................................... H04Q 11/04
[52] U.S. Cl. ........................................ 370/63; 370/58
[58] Field of Search ...................... 370/58, 63, 85, 64, 370/67

[56] References Cited

U.S. PATENT DOCUMENTS

| | | | |
|---|---|---|---|
| 4,206,322 | 6/1980 | Lurtz | 370/63 |
| 4,399,534 | 8/1983 | Simmons et al. | 370/58 |
| 4,402,077 | 8/1983 | Simmons et al. | 370/58 |
| 4,406,005 | 9/1983 | Simmons et al. | 370/58 |
| 4,442,502 | 4/1984 | Friend et al. | 370/67 |

Primary Examiner—Douglas W. Olms
Assistant Examiner—Curtis Kuntz
Attorney, Agent, or Firm—Anthony Miologos; Peter Xiarhos

[57] ABSTRACT

An arrangement for interfacing the originating time stage (OTS) and terminating time stage (TTS) of a time and control unit (TCU) to the space stage of T-S-T digital switching system. The space stage includes an intra-path through the space stage as well as an inter-path. The interface transmits PCM samples simultaneously from the OTS to both the intra and interpaths of the space stage. PCM samples from the space stage are received by an intra buffer and an inter buffer from the intra path and inter path respectively. A TCU control memory gates and connects either the intra buffer or inter buffer to the TTS.

6 Claims, 5 Drawing Figures

ARRANGEMENT FOR INTERFACING THE SPACE STAGE TO THE TIME STAGES OF A T-S-T DIGITAL SWITCHING SYSTEM

This is a continuation of co-pending application Ser. No. 506,743, filed on June 22, 1983, now abandoned.

BACKGROUND OF THE INVENTION

This invention relates in general to time-space-time (T-S-T) telecommunication switching systems, and in particular to an interface interconnecting the space stage to the time stages in a T-S-T switching system.

Time-space-time (T-S-T) switching systems are a configuration of digital switching elements providing both time and space translation between channels of time division multiplexed (TDM) telecommunications transmission lines. The T-S-T network of a switching system interconnects digital bi-directional TDM communication lines with TDM communication involving the sharing of single transmission paths, individually, in time, to provide multiple channels in a single transmission medium. The construction of such a T-S-T network comprises the connection of a spacial stage between the two time stages.

In such a network, digitized data is presented to a time stage for momentary storage in memory. At the appropriate time the data is bused to/from the space stage via a time shared switching path and then gated to a second time stage. Temporary buffering of the digitized data is normally required in order to ensure that the data transmitted or received is valid.

In T-S-T networks where the space stage is configured to provide a first switched path among a first or a second set of time stages (intra-path) or a second switched path between the first and second set of time stages (inter-path) an interface between the time stages and the space stage is required to selectively send and receive the digitized data to both the intra path and inter path of the network.

It therefore becomes the object of the present invention to provide an interface for each time stage of the digital switching system to interconnect to the space stage of the network when configured with both intra and inter connecting paths between the time stages.

SUMMARY OF THE INVENTION

The interface of the present invention allows for the sending and receiving of communications information (PCM samples) between a time and control unit (TCU) and a first and a second space stage. The time and control unit includes an originating time stage having an information memory originating and a control memory originating and the terminal time stage including an information memory terminating and a control memory terminating. Both control memories are connected to a microprocessor interface and to a peripheral processor which provides a source of control signals.

The interface of the present invention includes sending means comprising of a first set of bus drivers having their inputs connected to the information memory originating and their outputs connected via a PCM bus to the first space stage. A second set of bus drivers has their inputs connected to the inputs of the first set of bus driver and their outputs connected via a PCM bus to the second space stage.

First receiving means comprising of a set of PCM buffers is connected to the first space stage and arranged to temporarily store PCM samples sent to the interface. Second receiving means comprising a second set of PCM buffers is connected to the second space stage and also arranged to temporarily store PCM samples sent to the interface from the second space stage.

The PCM samples contained in the first and the second PCM buffers are transmitted to the information memory terminating via selection means. The selection means comprises a first set of tri-state gates having their inputs connected to the first PCM buffer and their outputs connected to the information memory terminating. A second set of tri-state gates has their inputs connected to the second set of PCM buffers and their outputs connected to the outputs of the first set of tri-state gates. Each of the first and second set of tri-state gates includes control inputs connected to the control memory terminating.

The control memory terminating via control signals from the peripheral processor determines from which space stage the PCM samples should be input into the information memory terminating. When samples from the first space stage should be input, a first control signal is sent to the first set of tri-state gates enabling the information in the first set of PCM buffers to be input into the information memory terminating. When PCM samples from the second space stage should be input, a second control signal is sent to the second set of tri-state gates. Thus, enabling the PCM samples in the second PCM buffer to be input into the information memory terminating.

DESCRIPTION OF THE PREFERRED EMBODIMENT

Figure 1:
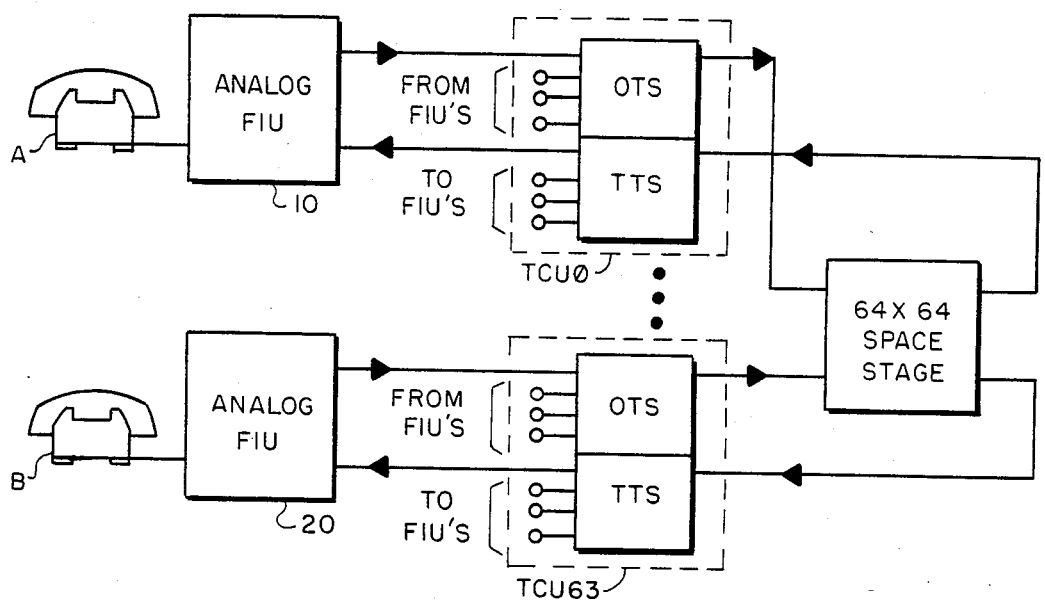
FIG. 1 is a block diagram depicting the network structure of a digital switching system.

FIG. 1, is a block diagram showing the single rail structure of a time-space-time network of a digital switching system for switching a local telephone call. Telephone subscriber A is connected to analog facility interface unit (FIU) 10. The analog FIU has a PCM voice connection to time and control unit (TCU) 0. The digital switching network may contain n number of TCUs, but will be limited to sixty-four TCUs for this embodiment. Each TCU has two time stages associated with it, an originating time stage (OTS) and a terminating time stage (TTS).

Each time stage (OTS or TTS) of each TCU may be connected to up to four FIUs. Therefore, the number of time control units (TCUs) is modularly expandable and may grow to fit the needs of the switching system. Next, a connection is made from the OTS of the particular TCU, in this example TCU 0 to the space stage 30 and the terminating time stage of TCU 63. The telephone subscriber B is then connected through analog FIU 20 to the TTS of TCU 63.

A voice transmission link is next established from subscriber B to subscriber A. This communication link is established via analog FIU 20, to the originating time stage (OTS) of TCU 63, through space stage 30, through the terminating time stage (TTS) of TCU 0, and finally through analog FIU 10 to subscriber A. At this time, a two way talking path has been established between subscribers A and B.

Figure 2:
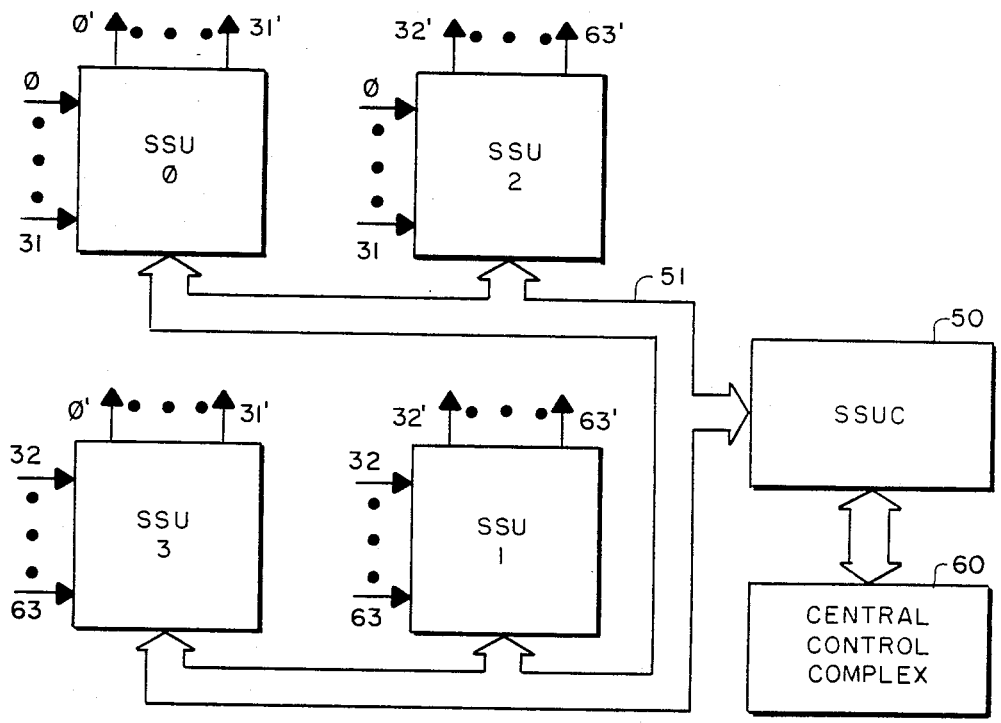
FIG. 2 is a block diagram representing a 64×64 space stage configuration.

Turning now to FIG. 2, a representation of the 64×64 space stage 30 of FIG. 1 is illustrated. The space stage is comprised of four identical space stage units (SSU) 0, 1, 2, and 3. Each space stage unit is a 32×32 matrix having 32 inputs (0 to 31 for SSU 0, and SSU 2 and 32 to 63 for SSU 1 and SSU 3) and 32 outputs (0' to 31' for SSU 0 and SSU 3, and 32' to 63' for SSU 1 and SSU 2). Connecting paths between the inputs and outputs of each SSU are controlled by a central control complex 60 through a space stage unit controller (SSUC) 50. The SSUC interfaces the central control complex to each SSU and controls and directs the data between the SSUs and the central control complex. The SSUC communicates with each SSU module via a bus 51 which includes address, data and control lines.

Figure 3:
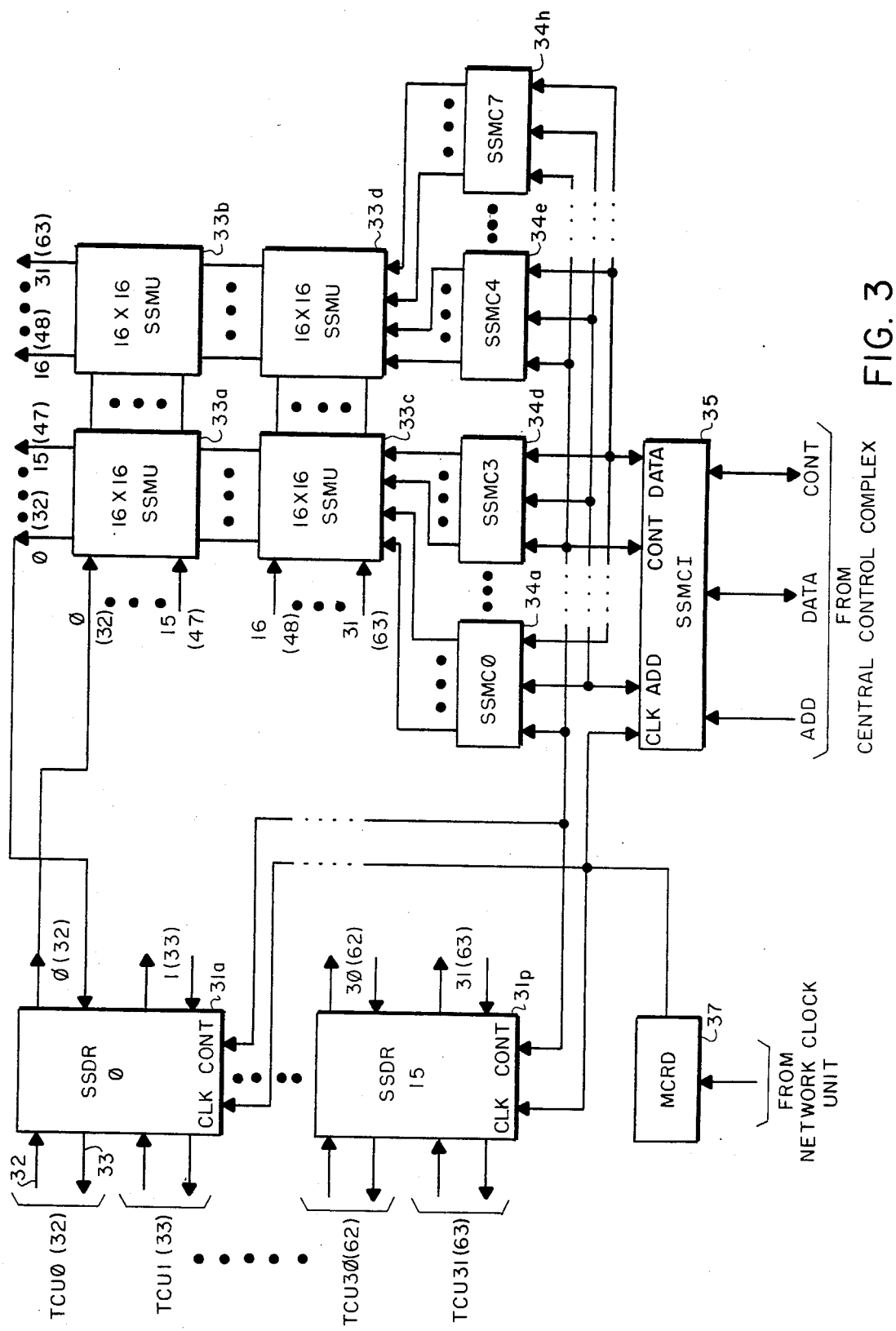
FIG. 3 is a schematic diagram of a space stage unit configured to interconnect one to thirty-two originating time stages and terminating time stages.

Turning now to FIG. 3, a schematic diagram representing a SSU of the present invention is illustrated. It should be noted, that the SSU represented in FIG. 3 is identical for each SSU, i.e. SSU 0, SSU 3, etc., shown in FIG. 2.

PCM samples from the TCUs of the T-S-T network enter and exit the SSU through a space stage driver/receiver (SSDR) interface 31a-31p. It should be noted twelve bits are required to represent the PCM sample, seven bits representing the amplitude of the voice signal, one bit represents the sign of the voice signal, three bits of supervisory signals and one parity bit. Therefore, each input to the SSU from a TCU and each output to a TCU from the SSU is twelve bits wide. Each SSDR includes drivers and receivers as well as buffers for temporarily storing PCM samples before they are sent out to the space stage matrix units (SSMU). Each SSDR 31a-31p can interface the OTS and TTS of two TCUs to the SSU. For example, input 32 of SSDR 31a would be connected to the OTS of TCU 0 for SSU 0 and SSU 2 and to the OTS of TCU 32 for SSU 3 and SSU 1. Output 33 of SSDR 31a would be connected to the TTS of TCU 0 or 32.

The space stage matrix provides a time shared switching path between the OTS and TTS of an individual TCU or between the OTS and TTS of different TCUs. The space stage matrix is comprised of four identical 16×16 space stage matrix units (SSMU) 33a-33d. Each SSMU is constructed from a plurality of 16:1 multiplexers. The multiplexers are combined into a 16×16 SSMU which is 12-bits wide. Control signals supplied to each multiplexer selects and enables the appropriate multiplexers for switching through the space stage matrix. The control signals are applied to each SSMU via a space stage memory control (SSMC). Each space stage memory control 34a-34h consists of four control memories (CM), (not shown) and their associated buffers. Each CM corresponds to a particular TCU TTS. Each CM selects, through control data written within the CM, which one of the sixteen input samples will be output. Address, data and control information are read into each SSMC via a space stage memory control interface (SSMCI). The SSMCI 35 can control eight SSMCs thereby interfacing each SSU to SSUC 50 and central control complex 60 of FIG. 2.

Finally, a timing generator or master clock receiver/distributor (MCRD) 37 is included which provides all the necessary timing signals for the operation of the SSU. The MCRD terminates a master clock signal from a network clock unit (NCU) and distributes a timing reference to the SSDRs, the SSMCs and the SSMCI.

With renewed reference to FIG. 3, a description of the operation of a SSU will be explained. PCM samples from the OTS are written into a buffer within the appropriate SSDR, addressed and strobed with timing signals transmitted from the sending TCU with the PCM samples. For example, in FIG. 3 the sample is transmitted from the TCU 0 on input 32 into a buffer within SSDR 31a. The written sample is latched out to the space stage matrix one time slot after the sample was written into the SSDR. This time slot is referred to as n+1. In time slot n, before time slot n+1, a path through the SSM is selected by reading the control memory within the appropriate SSMC. At the beginning of time slot n+1 the data written in the CM enables the appropriate multiplexers within the SSMU used to output the PCM sample. The PCM sample available at the SSDR buffer at the beginning of time slot n+1 is allowed to ripple through the addressed multiplexers and latched into the selected SSDR for transmission to a TCU near the end of the time slot. For example, the data written into the control memory associated with the TTS of TCU 0 of SSMC 34a, sets up a path through the space stage matrix from the 0 input to the 0 output of SSMU 33a. The PCM sample is latched into the appropriate buffer within SSDR 31a and sent to the TTS of TCU 0. In this manner each SSU is selectively able to provide switching paths between the thirty-two originating time stages and terminating time stages of thirty-two TCUs.

Figure 4:
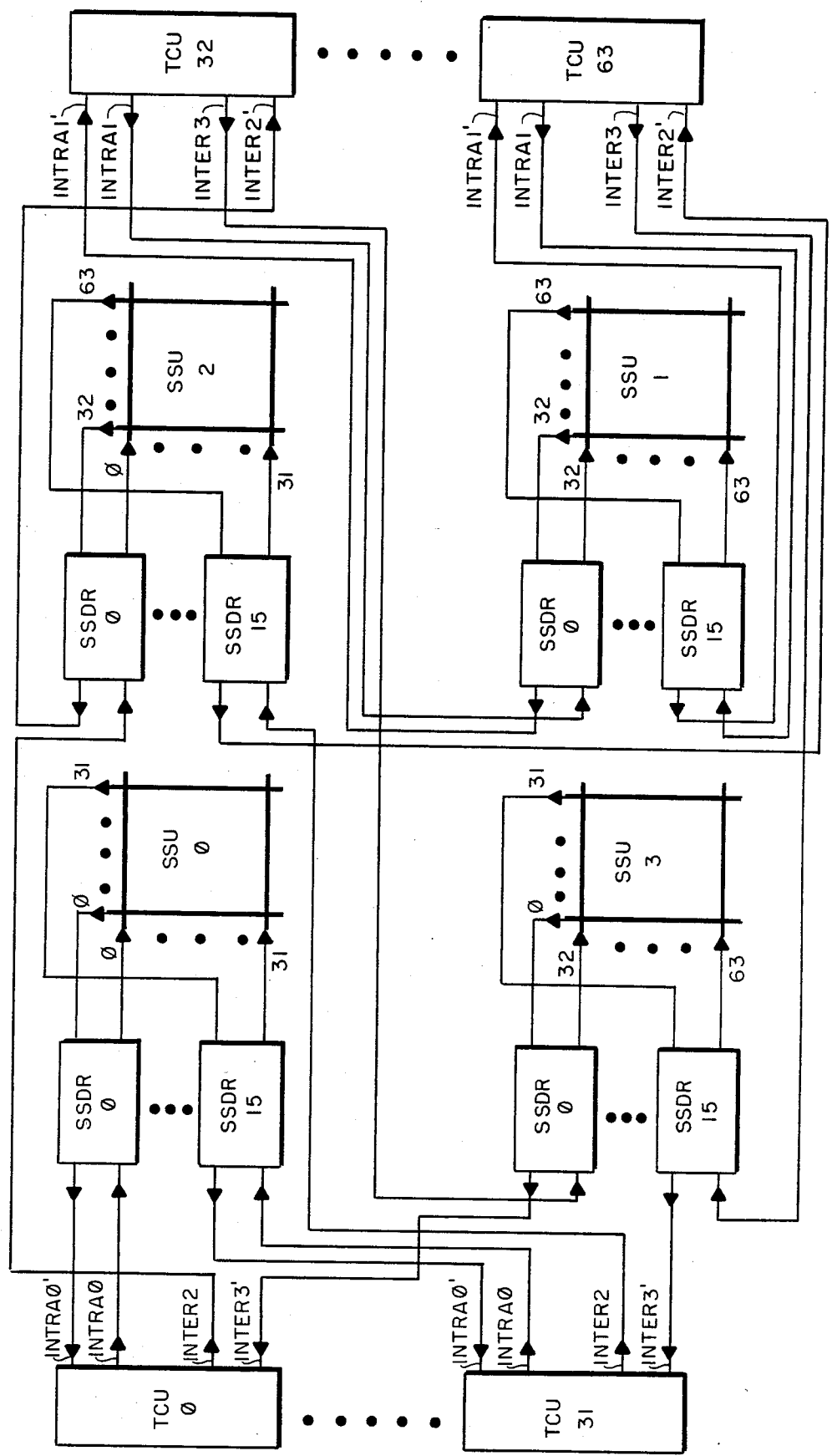
FIG. 4 is a diagram representing the interconnection of sixty-four time and control units (TCU) to the space stage.

Turning now to FIG. 4, the complete arrangement for a 64×64 space stage for a T-S-T network is illustrated. As can be seen the arrangement is comprised of a space stage which includes four SSUs; SSUs 0, 1, 2, and 3. Each SSU shown in FIG. 4, includes the requisite SSDR interfaces.

The four SSU modules are interconnected providing time shared switching paths to sixty-four TCUs. The sixty-four TCUs are divided into a first time group, including TCUs 0 through 31 and a second time group, including TCUs 32 through 63. Each SSU is additionally categorized as either an intra-group, (SSU 0 and SSU 1) or an inter-group (SSU 2 and SSU 3). The intra-group SSU 0 interconnects the OTS and TTS of TCUs 0 through 31. Likewise, intra-group SSU 1 interconnects the OTS and TTS of TCUs 32 through 63. Time shared switching paths between the first time group of TCUs (0-31) and the second time group of TCUs (32-63) is accomplished with the inter-group SSUs; SSU 2 and SSU 3. SSU 2 connects the OTSs of TCUs 0 through 31 to the TTSs of TCUs 32 through 63 and SSU 3 connects the OTSs of TCUs 32 through 63 to the TTSs of TCUs 0 through 31.

For example, to establish a communications path from the OTS of TCU 0 to the TTS of TCU 31, TCU 0 is connected to SSU 0 through sending line INTRA 0, SSDR 0, input line 0 of SSU 0, through the SSM to output line 31, SSDR 15 and finally to TCU 31 via receiving line INTRA 0. A return path interconnection can be effected between the OTS of TCU 31 and the TTS of TCU 0 via TCU 31s sending line INTRA 0, SSDR 15, input line 31 through the SSM to output line 0, SSDR 0 and to TCU 0 via receiving line INTRA 0'.

Switching paths between the first time group TCUs can be established in any combination through SSU 0 in the same manner described above.

Likewise, the second time group of TCUs (32–63) can be interconnected via sending/receiving lines INTRA 1, INTRA 1' respectively and the input/output lines of SSU 1.

To effect a switching path from the OTS of TCU 0 to the TTS of TCU 63 a connection is made via sending line INTER 2 of TCU 0, SSDR 0 of SSU 2, to input line 0 of SSU 2, through the SSM to output line 63, SSDR 15, and receiving line INTER 2' to TCU 63. The return connection to TCU 0 is effected through SSU 3 via the sending line INTER 3 of TCU 63 through SSU 3 to receiving line INTER 3' of TCU 0.

As can be readily seen in FIG. 4, SSU 2 is arranged to connect the OTSs of TCUs 0 through 31 to the TTSs of TCUs 32 through 63. Conversely, SSU 3 connects the OTSs of TCUs 32 through 63 to the TTSs of TCUs 0 through 31. Thereby, effectively interconnecting all sixty-four TCUs in the T-S-T network through the space stage.

Figure 5:
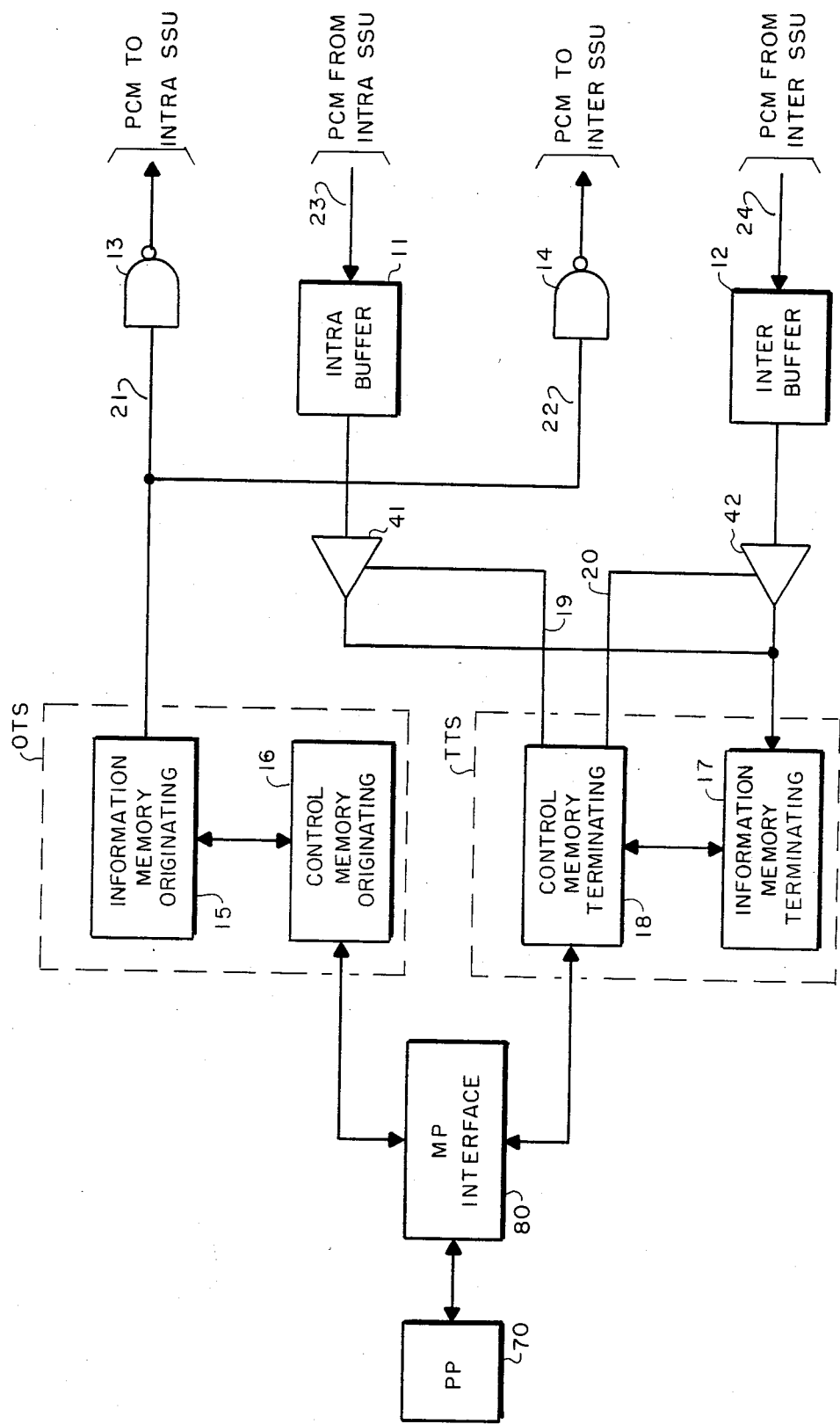
FIG. 5 is a block diagram of a time and control unit including the interface arrangement of the present invention.

FIG. 5, shows a particular TCU and the arrangement used to interface each TCU to the intra and inter SSUs. Each TCU is controlled by a peripheral processor (PP) 70. This processor may comprise the INTEL 8086 microprocessor or other similar INTEL unit. Each stage of the TCU, i. e. originating time stage (OTS) and terminating time stage (TTS) includes an information memory and a control memory. For example, the OTS shown, includes an information memory originating (IMO) 15 and a control memory originating 16.

Microprocessor interface 80 connects PP 70 to each of the control memories. These connections include an address and data bus and suitable controls for reading and writing the memory, along with clock signals. The information memories 15 and 17 each contain information memory units with PCM samples. As described previously in FIG. 1 each TCU has a capability of being connected to four FIUs. Each FIU provides for 193 channels of information to be transmitted to the information memory. Each information memory contains PCM samples representing the amplitude and sign of the voice signal. Twelve bits are required to represent the voice signal, seven bits representing the amplitude of the voice signal, one bit represents the sign of the voice signal, three bits of supervisory signals and one parity bit.

The control memory originating 16 and control memory terminating 18 each contain data which is provided by the PP 70 defining the input-output time slot relationship of the IMO 15 and IMT 17 respectively. Each channel originating from an FIU, is assigned a predefined time slot address in the IMO 15.

PCM samples are transmitted to the space stage units from the IMO 15 via a first bus 21 and intra SSU driver 13 and a second bus 22 and inter SSU driver 14. Since each PCM sample is comprised of 12 bits each of the buses includes 12 lines as well as a driver for each line. Drivers 13 and 14 are identical and each transmit PCM samples to the space stage simultaneously. The intra and inter SSU drivers 13 and 14 thereby send the same sample to both the intra and inter SSUs. The switched path through the space stage is selected by the central control complex by writing to the appropriate SSMC control memory corresponding to the receiving TCU, as described earlier in FIG. 3.

Depending therefore upon the selected receiving TCU the switched path through the space stage is either via one of the intra SSUs or one of the inter SSUs. The arrangement also allows for switching the PCM sample through both the intra and inter SSUs simultaneously to a receiving TCU in each time group, i.e. the sample may originate in TCU 00 and switched simultaneously to TCU 31 (intra SSU) and TCU 63 (inter SSU). The sample sent to the non-selected SSU is ignored and replaced by the next PCM sample to be switched.

Intra SSU buffer 11 and inter SSU buffer 12 receive PCM samples from their respective SSUs along buses 23 and 24 respectively, for transmission to the IMT 17 of the TCU TTS. The outputs of each buffer 11 and 12 is connected to a tri-state gates 41 and 42 respectively. Gates 41, 42 are controlled by the PP 70 via the control memory terminating 18 and are selectively enabled to connect the output of SSU buffer 11 or the output of SSU buffer 12 to IMT 17. Gate 41 is enabled via lead 19 when PCM data is within the same TCU set (0 through 31, 32 through 63). Gate 42 enabled via lead 21 when PCM data is from the inter SSUs or between groups 0 through 31 to groups 32 to 63.

It can be well appreciated by those skilled in the art that even though a single rail arrangement has been illustrated, a second duplicate copy of the space stage can be used in those T-S-T networks employing A and B rails. For example, a fully independently operating space stage would handle all time shared switching paths between TCUs on the A rail and similarly a second space stage would handle all switching between TCUs on the B rail. Both space stages would be identical to the other working independently handling switching between the TCUs connected to their respective rails. Thereby, the space stage described in this embodiment may be copied identically for each rail and is not limited thereto.

It can be appreciated that each one of the functional modules of FIG. 3 can be configured into circuit cards. The circuit cards in turn can be plugged into unit frames forming the SSUs. The circuit cards within the unit frames may be interconnected by a backplane arrangement. The SSDRs of each SSU in turn can be connected to the TCUs via the applicable bidirectional or unidirectional cables thereby, simplifying backplane wiring and the interconnections between the time stage and the space stage of the T-S-T network.

The present invention has been described to the reference of a specific embodiment thereof, for the purpose of illustrating the manner in which the invention may be used to advantage. It will be appreciated by those skilled in the art that the invention is not limited thereto. Accordingly, any and all modifications, variations or equivalent arrangements which may occur to those skilled in the art should be considered to be within the scope of the invention.

What is claimed is:

1. An interface for a time-space-time network for sending and receiving communications information comprising PCM samples between a time and control unit and a space stage matrix having at least first and a second space state units, each space stage unit forming a separate and distinct path through said space stage matrix and said time and control unit including an originating time stage having an information memory originating for storing said communications information, said information memory originating connected to a source of control signals, and a terminating time state including an information memory terminating and a control memory terminating said control memory terminating connected to said source of control signals, said interface comprising:

sending means including at least a first bus driver having an input connected to said information memory originating of said time and control unit and an output connected to said first space stage unit and at least a second bus driver having an input connected to said first bus driver input and said second bus driver output connected to said second space stage unit, said sending means arranged to simultaneously transmit said communications information from said originating time stages information memory originating to each of said first and second space stage units responsive to said control signals;

first and second receiving means connecting said time and control unit to each of said first and second space stage units respectively, said first and second receiving means each arranged to receive communications from said first and second space stage units respectively; and selection means connected to each of said first and second receiving means and to said control memory terminating, and responsive to control signals from said control memory terminating said selection means connects said first or alternatively said second receiving means to said information memory terminating transmitting said communications information to said terminating time stage.

2. An interface for a time-space-time network as claimed in claim 1, wherein said originating time stage further includes a control memory originating connected to said information memory originating and said source of the control signals is a peripheral processor connecting said control memory originating to said processor via a microprocessor interface.

3. The interface for a time-space-time network as claimed in claim 1, wherein said communication information comprises PCM samples and said first receiving means comprises a first PCM bus connected to said first space stage and a first set of PCM buffers, and said second receiving means comprises a second PCM bus connected to said second space stage and a second set of PCM buffers, each of said first and second set of PCM buffers arranged to receive and temporarily store PCM samples sent to said interface from each of said first and second space stages respectively.

4. An interface for a time-space-time network as claimed in claim 3, wherein; said first and said second set of PCM buffers each include an output bus, and said selection means comprises of at least one first switchable gate having an input and an output, said first switchable gate input connected to said first PCM buffer and said first switchable gate output connected to said information memory terminating, and at least one second switchable gate having an input and an output and said second switchable gate input connected to said second PMC buffer and said second switchable gate output connected to said first switchable gate output, said first switchable gate including a control input connected to said control memory terminating, whereby responsive to a first control signal said first switchable gate is enabled transmitting said PCM samples from said first PCM buffer to said information memory terminating.

5. An interface for a time-space-time network as claimed in claim 4, wherein: said second switchable gate includes a control input connected to said control memory terminating and responsive to a second control signal from said control memory terminating, said second switchable gate is enabled transmitting said PCM samples from said second PCM buffer to said information memory terminating.

6. An interface for a time-space-time network as claimed in claim 3, wherein said source of control information is a peripheral processor connected to said control memory terminating via the microprocessor interface.

* * * * *